United States Patent [19]
Hayafune et al.

[11] Patent Number: 5,702,318
[45] Date of Patent: Dec. 30, 1997

[54] CHAIN TENSIONING DEVICE

[75] Inventors: Hiroshi Hayafune; Atsushi Kumakura, both of Iruma, Japan

[73] Assignee: Tsubakimoto Chain Co., Osaka, Japan

[21] Appl. No.: 611,005

[22] Filed: Mar. 5, 1996

[30] Foreign Application Priority Data

Mar. 7, 1995 [JP] Japan .................. 7-072524

[51] Int. Cl.⁶ .................................................. F16H 7/08
[52] U.S. Cl. ........................................ 474/111; 474/140
[58] Field of Search ................................ 474/135, 101, 474/109, 111, 140

[56] References Cited

U.S. PATENT DOCUMENTS

| | | | |
|---|---|---|---|
| 389,835 | 9/1888 | Cooley | 474/111 |
| 3,115,046 | 12/1963 | Bliss et al. | 474/111 |
| 3,869,138 | 3/1975 | Allison | 474/111 X |
| 4,177,689 | 12/1979 | Zellinger et al. | 474/111 X |
| 4,299,583 | 11/1981 | Kraft et al. | 474/110 |
| 4,678,454 | 7/1987 | Gall | 474/111 X |
| 4,708,696 | 11/1987 | Kimura et al. | 474/103 |
| 4,713,043 | 12/1987 | Biedermann | 474/111 |
| 4,874,352 | 10/1989 | Suzuki | 474/110 |
| 5,055,088 | 10/1991 | Cradduck et al. | 474/111 |
| 5,246,404 | 9/1993 | Ojima | 474/111 |

FOREIGN PATENT DOCUMENTS

| | | |
|---|---|---|
| 313961 | 6/1929 | United Kingdom . |
| 758856 | 10/1956 | United Kingdom . |
| 1206705 | 9/1970 | United Kingdom . |
| 2092705 | 8/1982 | United Kingdom . |

*Primary Examiner*—Roger J. Schoeppel
*Attorney, Agent, or Firm*—Armstrong, Westerman, Hattori, McLeland & Naughton

[57] ABSTRACT

A chain tensioning device includes a pair of levers interconnected and fixed at one end to a rotatably supported base and extending along the chain to be tensioned and a tensioner connected to the other end of one of the pair of levers. One of the levers is disposed on the end side of the chain to be tensioned as viewed from the rotatably supported base and has a convexly curved surface touching internally the chain, and a shoe attached to the convexly curved surface. The other of the levers is disposed on the departure side of the chain as viewed from the base and has a convexly curved surface touching externally the chain, and a shoe attached to the convexly curved surface. A projection on a side of the one of the levers opposite to the shoe for receiving a thrusting force from the tensioner 20 and applying such thrusting force to the interconnected levers.

1 Claim, 4 Drawing Sheets

CHAIN TENSIONING DEVICE

The present invention relates to a chain tensioning device for exerting a proper tension on a power transmission chain.

BACKGROUND OF THE INVENTION

A conventional chain tensioning device 60, as shown in FIG. 4, includes a lever 62 pivotally movable about its one end, and a tensioner 64 for applying a rotational force to the lever 62. When a chain 66 becomes loose, a plunger 68 of the tensioner 64 projects to turn the lever 62 about its pivoted end.

The conventional chain tensioning device 60 requires a large space for installation thereof due to a large amount of movement or displacement of the lever 62. The plunger 68, used for actuating the lever 62, should necessarily have a large stroke which will necessarily increase the overall size of the chain tensioning device.

BRIEF DESCRIPTION OF THE INVENTION

To solve the foregoing problems, the present invention provides a chain tensioning device which comprises: a lever including a first arm having a curved surface touching internally a chain, and a second arm having a curved surface touching externally the chain and formed, integrally with the first arm, with their respective one ends adjoining each other at a central portion of the lever; and a tensioner for applying a rotational force to the lever.

When the chain becomes loose, the tensioner applies a rotational force to the lever to turn the lever about its central portion, where respective one ends of the first and second arms are adjoining each other. With this angular movement of the lever, the first arm forces the chain in an outward direction with its curved surface touching internally the chain, while the second arm forces the chain in an inward direction with its curved surface touching externally the chain. Thus, the first and second arms, simultaneously, exert a proper tension on the chain.

DETAILED DESCRIPTION OF THE PREFERRED EMBODIMENT

The instant invention will be more fully described and better understood from the following description of the drawings.

Figure 1:
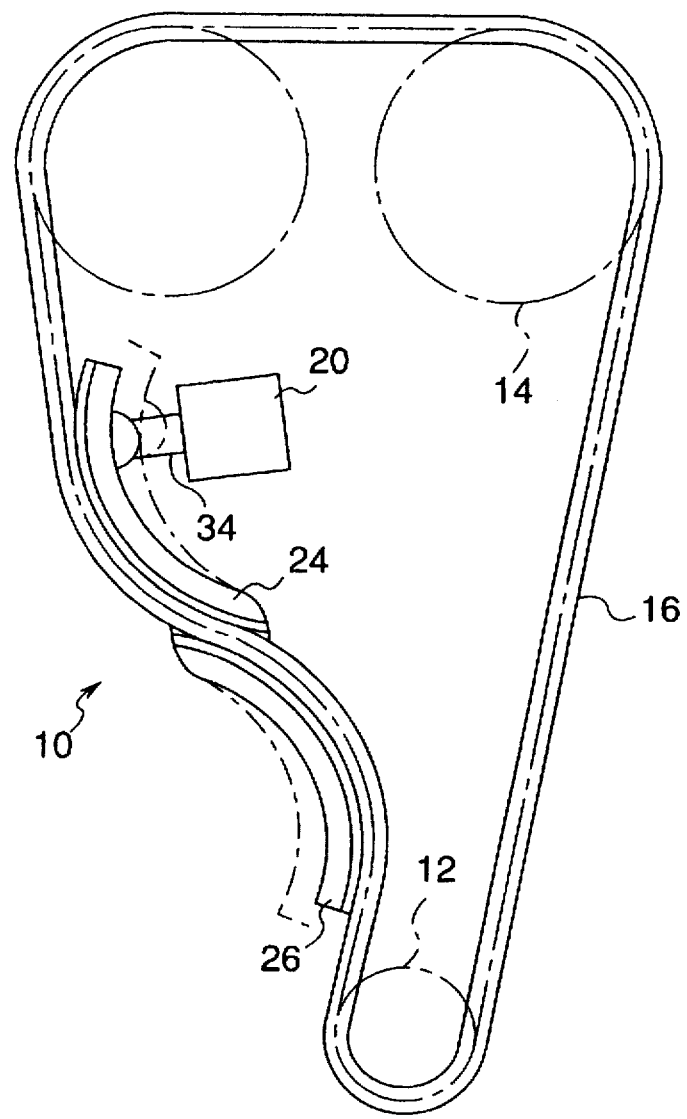
FIG. 1 is a front elevational view of a chain tensioning device according to the present invention.

In FIG. 1, crank sprocket 12 is connected to cam sprocket 14 by chain 16. Chain tensioning device 10 includes levers 24, 26 and a tensioner 20 disposed on the return side of the chain 16.

Figure 2A:
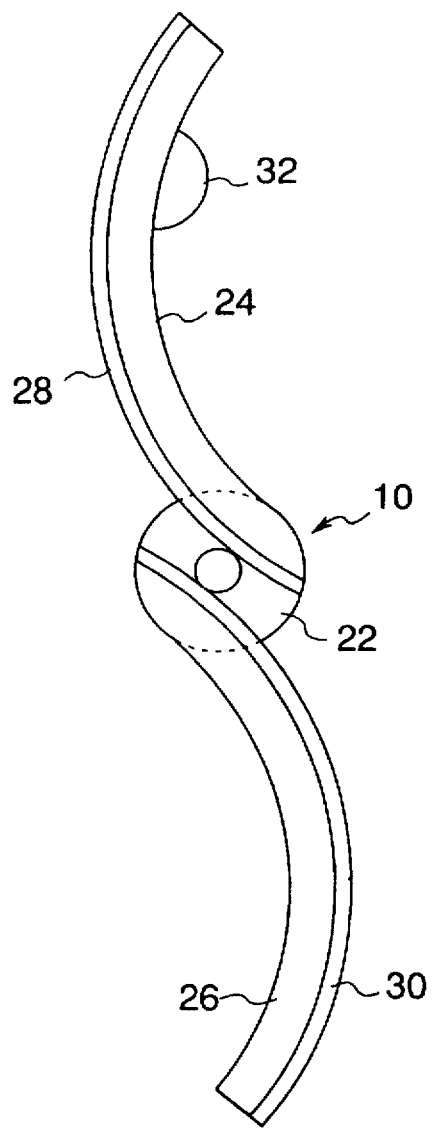
FIG. 2(a) is a front elevational view of a lever used in the chain tensioning device.
Figure 2B:
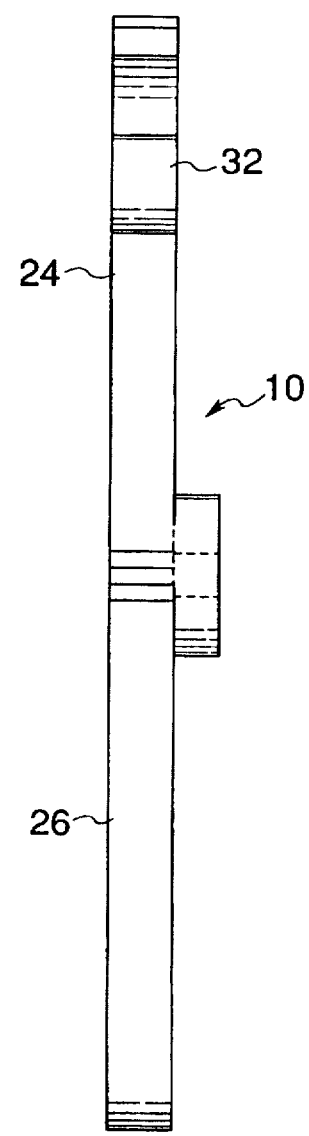
FIG. 2(b) is a side view of the lever of FIG. 2(b)

As shown in FIGS. 2(a), 2(b) the adjoining ends of levers 24, 26 are fixed to base 22 rotatably supported on an engine block (not shown). The adjoining ends of levers 24, 26 are formed integrally with the base 22 at their respective end adjoining each other on the base 22. Thus, lever 10 has an axis of rotation at a midpoint or the center of tensioning device 10.

The lever 24 is located on the approach or entry side of the chain 16, as viewed from the base 22, and has a convexly curved surface touching internally the chain 16, and a shoe 28, FIG. 2(a) attached to the convexly curved surface. Similarly, the lever 26 is located on the departure or leaving side of the chain 16, as viewed from the base 22, and has a convexly curved surface touching externally the chain 16, and a shoe 30, FIG. 2(a) attached to the convexly curved surface. The shoes 28 and 30 each have a convexly curved surface forming a running plane of the chain 16. The convexly curved surfaces of shoes 28 and 30 are preferably composed of an arcuate surface.

The convexly curved surfaces of the respective shoes 28, 30 have portions confronting each other in the vicinity of the center of the base 22 (i.e., the axis of rotation of tensioning device 10) so as to define, therebetween, a guide channel, FIG. 1, for the passage therethrough of the chain 16. By virtue of the particular arrangement of the arms 24, 26, the lever 18 defines there along a traveling path of the chain 16 which is curved into a substantially S shape in a front view of tensioning device 10.

Figure 4:
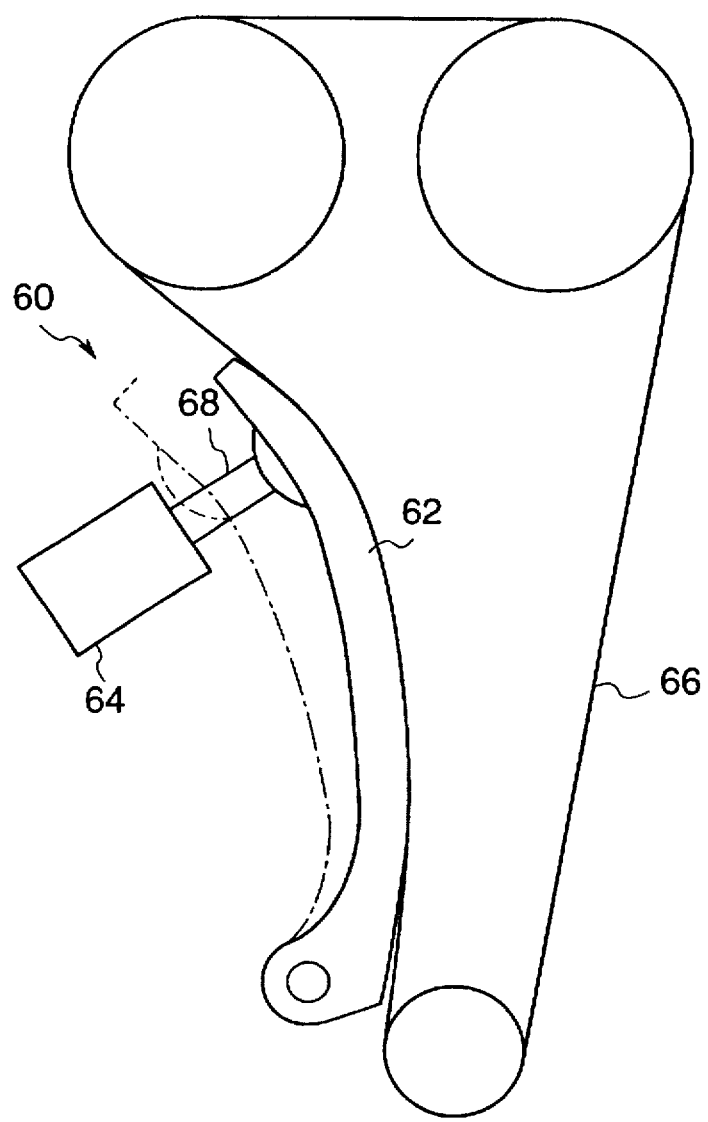
FIG. 4 is a front elevational view of a prior art chain tensioning device.

The arm 24 has a projection 32 FIG. 2(a) on the opposite side from the shoe 28 for receiving thereon a thrusting force from the tensioner 20. The projection 32 has a round or arcuate shape in the front view of tensioning device 10. The thrusting force generated from the tensioner 20 acts on lever 24 in a direction tending to turn the lever 24 counterclockwise in FIG. 2(a). Upon receipt of the rotational force from the tensioner 20, the tensioning device 10 starts turning about the center of the base 22. The lever 24 touching internally the chain 16 forces the chain 16 outwardly and, at the same time, the lever 26 touching externally the chain 16 forces the chain 16 inwardly whereby a sag or slack in the chain 16 is taken up. Owing to the arrangement of the levers 24, 26 of the tensioning device 10, the stroke of a plunger 34 (FIG. 1) of the tensioner 20 is reduced to approximately half of the stroke of the plunger of the conventional chain tensioning device, such as, shown in FIG. 4. The tensioning device 10, while in motion, occupies an area which is approximately half of the area occupied by the lever of the conventional chain tensioning device, FIG. 4.

Figure 3:
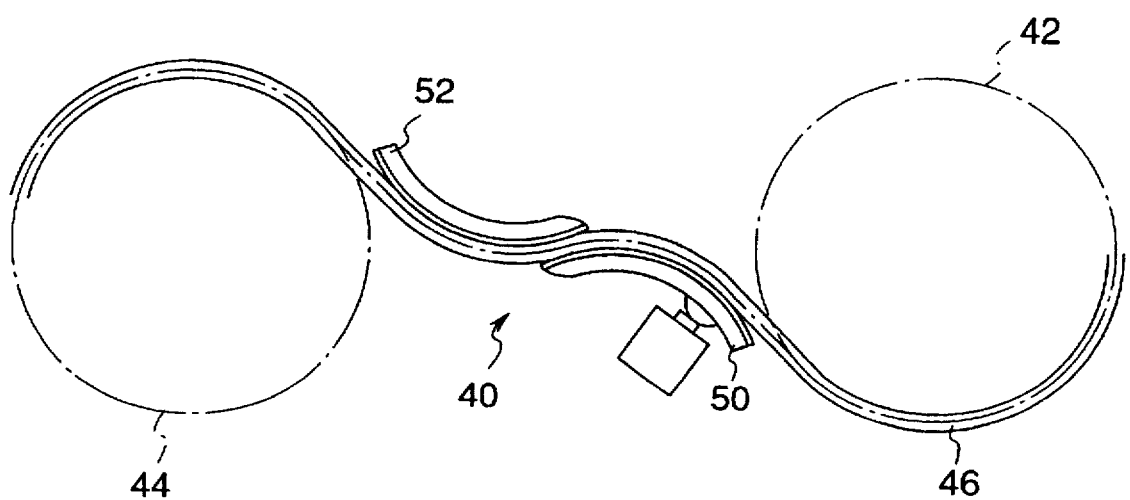
FIG. 3 is a front elevational view of another embodiment of the invention.

FIG. 3 illustrates another embodiment of the chain tensioning device according to the present invention. The chain tensioning device 40 in this embodiment is used with a chain 46 running crosswise around a pair of sprockets 42 and 44. The chain tensioning device 40 includes a pair of levers 50 and 52 each having a convexly curved surface laid in confrontation to a neighboring one of the sprockets 42, 44, and joined and fixed at their adjacent ends, such as, by a base 22, FIG. 2(a) rotatably supported, such as on an engine block (not shown) so that when the chain tensioning device 40 is turned by a tensioner (not designated), the contact angle of the chain 46 is enlarged.

According to the chain tensioning device of the present invention, when the tensioner applies a rotational force to the lever, one arm of the lever, having a curved surface touching, internally, the chain tensioning device forces the chain at one arm of the lever in an outward direction and, at the same time, the other arm of the lever, having a curved surface touching externally the chain, forces the chain in an inward direction. With this arrangement, the amount of movement, or displacement, of the lever is considerably small as compared to that of the conventional chain tensioning device with the result that the chain tensioning device of this invention can exert a proper tension on the chain with a minimum space occupied by the lever. This arrangement also makes it possible to reduce the stroke of a plunger of the tensioner, so that the tensioner is small in size and light in weight and can be constructed less costly.

What is claimed:

1. A chain tensioning device for use with an endless chain having an inner surface and an outer surface, comprising:

a first lever having a surface curved in a first direction so as to be engageable with said inner surface of said chain;

a second lever having a curved surface curving in a direction opposite to said first direction so as to be engageable with said outer surface of said chain;

a base having a pivot axis and being rotatable with respect thereto, wherein said first lever and said second lever being joined and fixed to each other at adjoining ends by said base; and a tensioner attached to one end of one of said levers opposite to said adjoining ends for applying a rotational force to said levers for rotating said levers about said pivot axis of said base for tensioning said chain.

* * * * *